(12) United States Patent
Wu et al.

(10) Patent No.: US 11,209,584 B1
(45) Date of Patent: Dec. 28, 2021

(54) LIQUID CRYSTAL GRATING AND FABRICATION METHOD THEREOF, AND DISPLAY DEVICE

(71) Applicant: Hubei Yangtze Industrial Innovation Center Of Advanced Display Co., Ltd., Wuhan (CN)

(72) Inventors: Yaodong Wu, Shanghai (CN); Yang Zeng, Shanghai (CN); Shihao Tang, Shanghai (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 17/124,703

(22) Filed: Dec. 17, 2020

(30) Foreign Application Priority Data

Oct. 29, 2020 (CN) .......................... 202011183787.1

(51) Int. Cl.
| | | |
|---|---|---|
| *G02B 5/30* | (2006.01) | |
| *G02F 1/13363* | (2006.01) | |
| *G02B 5/18* | (2006.01) | |
| *G02F 1/1343* | (2006.01) | |
| *G02F 1/1335* | (2006.01) | |
| *G02F 1/1337* | (2006.01) | |
| *G02F 1/1347* | (2006.01) | |

(52) U.S. Cl.
CPC ......... *G02B 5/3016* (2013.01); *G02B 5/1833* (2013.01); *G02B 5/3083* (2013.01); *G02F 1/1337* (2013.01); *G02F 1/1347* (2013.01); *G02F 1/133528* (2013.01); *G02F 1/133638* (2021.01); *G02F 1/134309* (2013.01); *G02F 2201/30* (2013.01)

(58) Field of Classification Search
CPC ........... G02F 2201/30; G02F 1/133638; G02F 1/1335; G02F 1/1347; G02B 5/2083; G02B 5/1833
See application file for complete search history.

(56) References Cited

U.S. PATENT DOCUMENTS

2018/0314075 A1* 11/2018 Zhang ................. G02F 1/13439

FOREIGN PATENT DOCUMENTS

| CN | 106200058 A | 12/2016 |
|---|---|---|
| CN | 108267897 A * | 7/2018 |
| CN | 111045230 A | 4/2020 |

* cited by examiner

*Primary Examiner* — Jessica M Merlin
(74) *Attorney, Agent, or Firm* — Anova Law Group, PLLC

(57) ABSTRACT

A liquid crystal grating and its fabrication method, and a display panel are provided in the present disclosure. The liquid crystal grating includes a first light adjustment component and a second light adjustment component, disposed oppositely. The first light adjustment component includes a first liquid crystal panel and a first polarization adjustment component; the second light adjustment component includes a second liquid crystal panel and a second polarization adjustment component; and using a second direction as an extending direction of a rotation axis, when the first light adjustment component is rotated 180° around the rotation axis, an alignment direction of the first liquid crystal panel is in parallel with an alignment direction of the second liquid crystal panel, and an optical axis direction of the first polarization adjustment component is in parallel with an optical axis direction of the second polarization adjustment component.

19 Claims, 9 Drawing Sheets

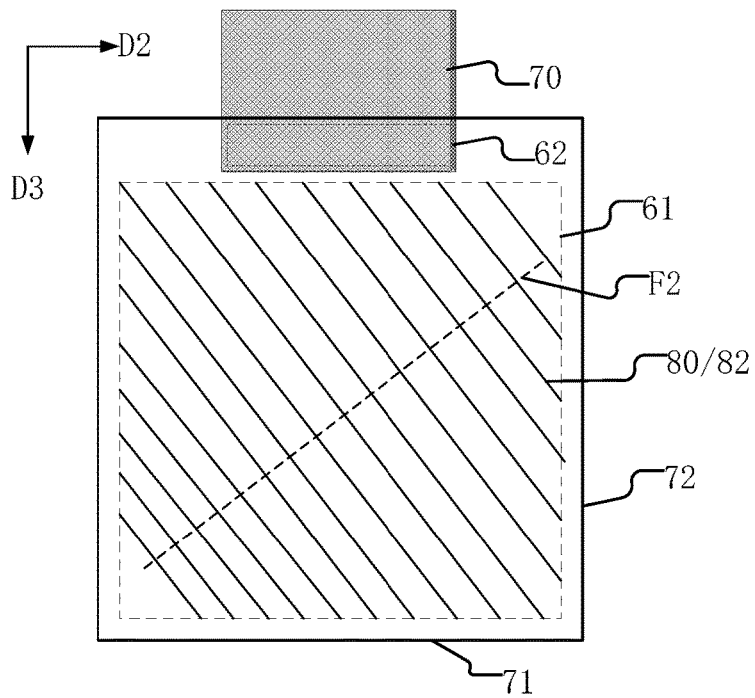

FIG. 12

S01
Providing two same light adjustment components, each including a liquid crystal panel and a polarization adjustment component disposed on a first surfaces of the liquid crystal panel, where the two light adjustment components are a first light adjustment component and a second light adjustment component S02
Oppositely disposing the first light adjustment component and the second light adjustment component along a first direction and combining the first light adjustment component and the second light adjustment component into the liquid crystal grating

FIG. 13

LIQUID CRYSTAL GRATING AND FABRICATION METHOD THEREOF, AND DISPLAY DEVICE

CROSS-REFERENCE TO RELATED APPLICATION

This application claims the priority of Chinese Patent Application No. 202011183787.1, filed on Oct. 29, 2020, the content of which is incorporated herein by reference in its entirety.

TECHNICAL FIELD

The present disclosure generally relates to the field of display technology and, more particularly, relates to a liquid crystal grating and its fabrication method, and a display device.

BACKGROUND

The display industry has experienced decades of rapid development from the cathode ray tube (CRT) era to the liquid crystal display (LCD) era, and then to the current organic light-exiting diode (OLED) era. Display technology has become essential for electronic devices, from conventional mobile phones, tablets, TVs, and PCs, to modern smart wearable devices, virtual reality (VR) devices, and the like.

In order to meet people's stereoscopic display demand for display devices, holographic 3D display has become a major development direction in the current display field. For the holographic 3D display device, a left-eye image and a right-eye image needs to be formed based on incident light through a liquid crystal grating, thereby facilitating the realization of the holographic 3D display.

The liquid crystal grating may be composed of two liquid crystal panels and a half-wave plate, and the attaching between the two liquid crystal panels and the half-wave plate may be implemented through different and complicated fabrication processes.

SUMMARY

One aspect of the present disclosure provides a liquid crystal grating. The liquid crystal grating includes a first light adjustment component and a second light adjustment component, disposed oppositely. The first light adjustment component includes a first liquid crystal panel and a first polarization adjustment component disposed on a first surface of the first liquid crystal panel; the second light adjustment component includes a second liquid crystal panel and a second polarization adjustment component disposed on a first surface of the second liquid crystal panel; along a first direction, the first polarization adjustment component and the second polarization adjustment component are configured between the first liquid crystal panel and the second liquid crystal panel, where the first direction is a stacking direction of the first light adjustment component and the second light adjustment component; using a second direction as an extending direction of a rotation axis, when the first light adjustment component is rotated 180° around the rotation axis, an alignment direction of the first liquid crystal panel of the first light adjustment component is in parallel with an alignment direction of the second liquid crystal panel, and an optical axis direction of the first polarization adjustment component is in parallel with an optical axis direction of the second polarization adjustment component; and an angle between the alignment direction of the first liquid crystal panel and the second direction is not equal to 90°; and an angle between the optical axis direction of the first polarization adjustment component and the second direction is not equal to 90°, where the second direction is perpendicular to the first direction.

Another aspect of the present disclosure provides a method for fabricating a liquid crystal grating. The method includes providing two same light adjustment components, each including a liquid crystal panel and a polarization adjustment component disposed on a first surfaces of the liquid crystal panel, where the two same light adjustment components are a first light adjustment component and a second light adjustment component; the first light adjustment component includes a first liquid crystal panel and a first polarization adjustment component; and the second light adjustment component includes a second liquid crystal panel and a second polarization adjustment component; and oppositely disposing the first light adjustment component and the second light adjustment component along a first direction and combining the first light adjustment component and the second light adjustment component into the liquid crystal grating, where in the liquid crystal grating, along the first direction, the first polarization adjustment component and the second polarization adjustment component are configured between the first liquid crystal panel and the second liquid crystal panel; and the first direction is a stacking direction of the first light adjustment component and the second light adjustment component. When the first light adjustment component is rotated 180 degrees around a rotation axis, a disposing position of the first light adjustment component is same as a disposing position of the second light adjustment component along a plane perpendicular to the first direction.

Another aspect of the present disclosure provides a display device. The display device includes a light source device, configured to emit coherent RGB tricolor light in time sequence; a beam expanding/collimating component, configured to perform beam expanding and collimating processing on the light emitted from the light source device; a spatial light modulator, configured to sequentially perform phase modulation and amplitude modulation on the light exited from the beam expanding/collimating component; a field lens, configured to improve an ability of edge light of the light exited from the spatial light modulator to enter a liquid crystal grating; and the liquid crystal grating, configured to form a left-eye image and a right-eye image based on incident light. The liquid crystal grating includes a first light adjustment component and a second light adjustment component, disposed oppositely. The first light adjustment component includes a first liquid crystal panel and a first polarization adjustment component disposed on a first surface of the first liquid crystal panel; the second light adjustment component includes a second liquid crystal panel and a second polarization adjustment component disposed on a first surface of the second liquid crystal panel; along a first direction, the first polarization adjustment component and the second polarization adjustment component are configured between the first liquid crystal panel and the second liquid crystal panel, where the first direction is a stacking direction of the first light adjustment component and the second light adjustment component; using a second direction as an extending direction of a rotation axis, when the first light adjustment component is rotated 180° around the rotation axis, an alignment direction of the first liquid crystal panel of the first light adjustment component is in parallel with an alignment direction of the second liquid crystal panel, and an optical axis direction of the first polarization adjustment component is in parallel with an optical axis direction of the second polarization adjustment component; and an angle between the alignment direction of the first liquid crystal panel and the second direction is not equal to 90°; and an angle between the optical axis direction of the first polarization adjustment component and the second direction is not equal to 90°, where the second direction is perpendicular to the first direction.

Other aspects of the present disclosure can be understood by those skilled in the art in light of the description, the claims, and the drawings of the present disclosure.

BRIEF DESCRIPTION OF THE DRAWINGS

Drawings incorporated in the specification and forming a part of the specification demonstrate the embodiments of the present disclosure and, together with the specification, describe the principles of the present disclosure.

FIG. 12 illustrates a schematic of grating electrodes in a second liquid crystal panel according to various embodiments of the present disclosure;

FIG. 13 illustrates a flowchart of a method for fabricating a liquid crystal grating according to various embodiments of the present disclosure;

DETAILED DESCRIPTION

Figure 1:
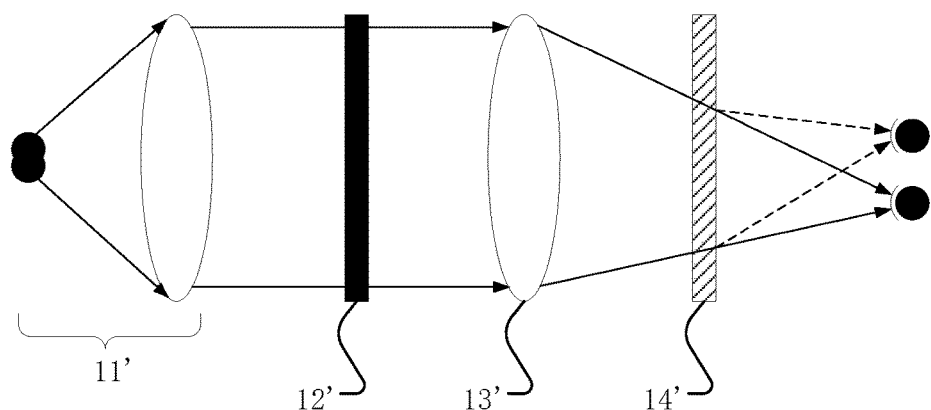
FIG. 1 illustrates a structural schematic of an existing holographic 3D display device.

Various embodiments of the present disclosure are described in detail with reference to the drawings. It should be noted that the relative arrangement of components and steps, numerical expressions, and numerical values set forth in the embodiments may not limit the scope of the present disclosure unless specifically stated otherwise.

The following description of at least one exemplary embodiment is merely illustrative, which may not limit the present disclosure and its application or use.

Techniques, methods and equipment known to those skilled in the art may not be discussed in detail, but where appropriate, the techniques, methods and equipment should be considered as a part of the specification.

In all exemplary embodiments shown and discussed herein, any specific values should be interpreted as merely exemplary and not limiting. Therefore, other examples of the exemplary embodiments may have different values.

It should be noted that similar reference numerals and letters indicate similar items in the following drawings. Therefore, once an item is defined in one drawing, there is no need to discuss it further in subsequent drawings.

The principle of an existing stereoscopic 3D display is based on binocular parallax. The left eye and the right eye may each view a different two-dimensional image, and the 3D experience may be formed through the binocular parallax. The holographic 3D display principle may be based a three-dimensional spatial display, and an observer may focus on objects individually at any depth. The holographic 3D display may be implemented based on a device shown in FIG. 1.

Referring to FIG. 1, FIG. 1 illustrates a structural schematic of an existing holographic 3D display device. The holographic 3D display device may include a backlight source 11', a spatial light modulator 12', a field lens 13' and a liquid crystal grating 14'. The backlight source may include a light source device and an expanding/collimating component, which is used to emit coherent RGB tricolor light in time sequence. The spatial light modulator 12' may be used to perform phase modulation and amplitude modulation on the light. The liquid crystal grating 14' may modify the deflection angle of the light adjusted by the spatial light modulator 12', such that different light may enter two eyes to implement a large-angle holographic display.

In the existing technology, the liquid crystal grating may be composed of two liquid crystal panels and a half-wave plate, and the attaching of the two liquid crystal panels and the half-wave plate may be implemented through different complicated fabrication processes with increased difficulty.

The present disclosure provides a liquid crystal grating and its fabrication method, and a display device, thereby simplifying the fabrication process of the liquid crystal grating. The detailed description is described with reference to the drawings and embodiments hereinafter.

Figure 2:
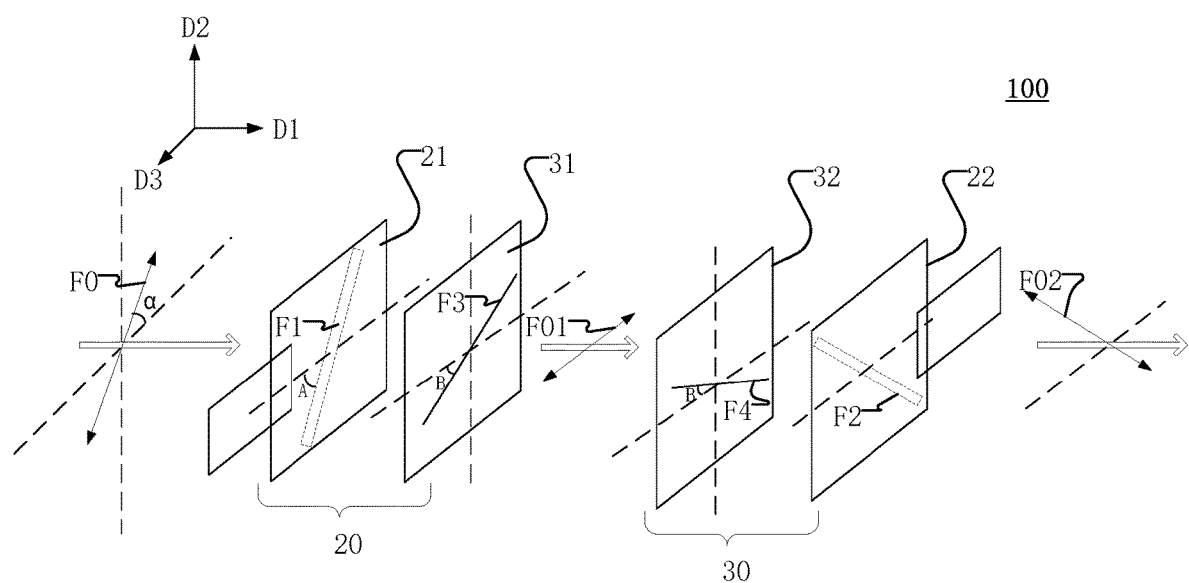
FIG. 2 illustrates a structural schematic of a liquid crystal grating according to various embodiments of the present disclosure.
Figure 3:
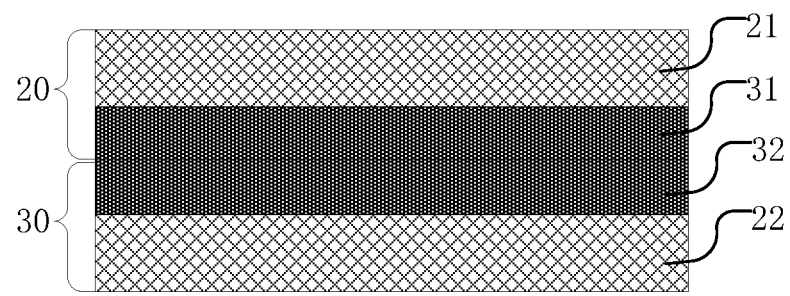
FIG. 3 illustrates a cross-sectional schematic of a liquid crystal grating according to various embodiments of the present disclosure.

Referring to FIGS. 2-3, FIG. 2 illustrates a structural schematic of a liquid crystal grating according to various embodiments of the present disclosure; and FIG. 3 illustrates a cross-sectional schematic of the liquid crystal grating according to various embodiments of the present disclosure. The liquid crystal grating 100 may include a first light adjustment component 20 and a second light adjustment component 30, disposed oppositely. The first light adjustment component 20 may include a first liquid crystal panel 21 and a first polarization adjustment component 31; and the first polarization adjustment component 31 may be disposed on a first surface of the first liquid crystal panel 21. The second light adjustment component 30 may include a second liquid crystal panel 22 and a second polarization adjustment component 32; and the second polarization adjustment component 32 may be disposed on a first surface of the second liquid crystal panel 22. Along a first direction D1, the first polarization adjustment component 31 and the second polarization adjustment component 32 may be configured between the first liquid crystal panel 21 and the second liquid crystal panel 22. The first direction D1 may be a stacking direction of the first light adjustment component 20 and the second light adjustment component 30.

Taking a second direction D2 as an extending direction of a rotation axis, when the first light adjustment component 20 is rotated 180° around the rotation axis, the alignment direction F1 of the first liquid crystal panel 21 of the first light adjustment component 20 may be in parallel with the alignment direction F2 of the second liquid crystal panel 22; and the optical axis direction F3 of the first polarization adjustment component 31 may be in parallel with the optical axis direction F4 of the second polarization adjustment component 32.

The angle between the alignment direction F1 of the first liquid crystal panel 21 and the second direction D2 may not be equal to 90°, and the angle between the optical axis direction F3 of the first polarization adjustment component 31 and the second direction D2 may not be equal to 90°, where the second direction D2 is perpendicular to the first direction D1.

It should be noted that, in order to clearly illustrate the structure of the liquid crystal grating 100, FIG. 2 shows various components in the liquid crystal grating 100 in the form of an exploded view. In fact, the first light adjustment component 20 and the second light adjustment component 30 in the liquid crystal grating 100 are embodied in a stacked structure as shown in FIG. 3. FIGS. 2-3 only illustrate the relative positional relationship of the first liquid crystal panel 21, the first polarization adjustment component 31, the second liquid crystal panel 22, and the second polarization adjustment component 32 in the liquid crystal grating 100, which may not represent actual sizes according to various embodiments of the present disclosure.

Referring to FIGS. 2-3, the liquid crystal grating 100 provided in the present disclosure may include the first light adjustment component 20 and the second light adjustment component 30, disposed oppositely. The first light adjustment component 20 may include the first liquid crystal panel 21 and the first polarization adjustment component 31 disposed on the first surface of the first liquid crystal panel 21; and the second light adjustment component 30 may include the second liquid crystal panel 22 and the second light adjustment component 30 disposed on the surface of the second liquid crystal panel 22. The first polarization adjustment component 31 and the second polarization adjustment component 32 may be configured between the first liquid crystal panel 21 and the second liquid crystal panel 22. The first liquid crystal panel 21, the first polarization adjustment component 31, the second polarization adjustment component 32, and the second liquid crystal panel 22 may be sequentially stacked along the first direction D1. After incident light sequentially passes through the first liquid crystal panel 21, the first polarization adjustment component 31, the second polarization adjustment component 32 and the second liquid crystal panel 22, the deflection angle of the incident light may be adjusted, such that light from different angles may enter human's left and right eyes to implement the large-angle holographic display. It should be noted that only one beam of light is used as an example for illustration. In fact, different light exited from the liquid crystal grating may enter the human's left and right eyes.

Figure 4:
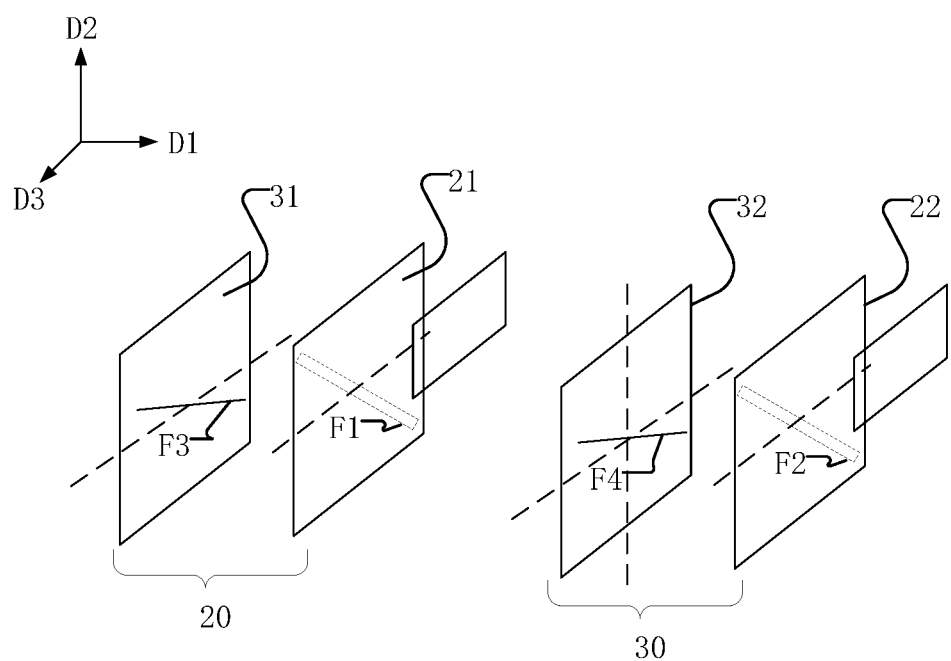
FIG. 4 illustrates a schematic of a liquid crystal grating after a first light adjustment component is rotated 180° around a rotation axis.

Referring to FIG. 2, in the liquid crystal grating 100 provided in the embodiments of the present disclosure, using the second direction D2 as the extending direction of the rotation axis, the first light adjustment component 20 is rotated 180° around the rotation axis, as shown in FIG. 4. FIG. 4 illustrates a schematic of the liquid crystal grating 100 after rotating the first light adjustment component 20 around the rotation axis by 180°. At this point, the alignment direction F1 of the first liquid crystal panel 21 in the first light adjustment component 20 may be in parallel with the alignment direction F2 of the second liquid crystal panel 22 in the second light adjustment component 30; and the optical axis direction F3 of the first polarization adjustment component 31 may be in parallel with the optical axis direction F4 of the second polarization adjustment component 32. From the structure shown in FIG. 4, after the first light adjustment component 20 is rotated around the rotation axis by 180°, the structures of the first light adjustment component 20 and the second light adjustment component 30 are exactly same, and the first light adjustment component 20 may be regarded as a duplicate of the second light adjustment component 30. In such way, when actually fabricating the liquid crystal grating 100 in the present disclosure, two identical light adjustment components may be used as the first light adjustment component 20 and the second light adjustment component 30 in the present disclosure, respectively. The first light adjustment component 20 and the second light adjustment component 30 may be disposed oppositely along the first direction D1 and combined into the liquid crystal grating 100. The oppositely disposed relationship between the first light adjustment component 20 and the second light adjustment component located in the liquid crystal grating 100 may satisfy the following hypothetical movement description: if the first light adjustment component 20 located in the liquid crystal grating is rotated 180° around the rotation axis, in a plane perpendicular to the first direction D1, the disposing position of the first light adjustment component 20 may be same as the disposing position of the second light adjustment component 30. It should be noted that the "same disposing position" mentioned here can be understood as the arrangement sequence of the second liquid crystal panel 22 and the second polarization adjustment component 32 along the first direction D1 may be same as the arrangement sequence of the first liquid crystal panel 21 and the first polarization adjustment component 31 along the first direction D1; and the projection of the second light adjustment component 30 on the plane perpendicular to the first direction D1 may coincide with the projection of the first light adjustment component 20 on the plane perpendicular to the first direction D1. It can be seen that when fabricating the liquid crystal grating 100 in the present disclosure, the light adjustment components may be fabricated only using a same process, and then the two light adjustment components may be combined to form the liquid crystal grating 100. In other words, the combination process of the first liquid crystal panel 21 and the first polarization adjustment component 31 and the combination process of the second liquid crystal panel 22 and the second polarization adjustment component 32 may be a same process. In the existing technology for the liquid crystal grating, in the two liquid crystal panels, the first liquid crystal panel needs to be attached to the half-wave plate, and the second liquid crystal panel also needs to be attached to the half-wave plate attached to the first liquid crystal panel. The two attaching processes may involve the attaching process of the liquid crystal panel and the half-wave plate, and the attaching process of the liquid crystal panel with the half-wave plate and the liquid crystal panel without the half-wave plate. Due to different objects involved in the attaching processes, the actual process needs to be divided into two different process flows correspondingly, and the attaching may be completed by different complicated processes. Therefore, compared with the liquid crystal grating in the existing technology which needs two different attaching processes, the first light adjustment component 20 and the second light adjustment component 30 in the liquid crystal grating 100 provided in the present disclosure may be fabricated by a same process, which is beneficial for simplifying the fabrication process of the liquid crystal grating 100, reducing the design and fabrication difficulty of the liquid crystal grating 100, and improving the production efficiency of the liquid crystal grating 100. Moreover, when the first light adjustment component 20 and the second adjustment component 30 in the present disclosure are embodied as the same light adjustment components, it may also be beneficial for improving the production yield of the liquid crystal grating 100.

Furthermore, in the present disclosure, the angle between the alignment direction F1 of the first liquid crystal panel 21 and the second direction D2 may not be equal to 90°, and the angle between the optical axis direction F3 of the first polarization adjustment component 31 and the second direction D2 may not be equal to 90°. If the angle between the alignment direction F1 of the first liquid crystal panel 21 and the second direction D2 is set to be 90°, and the angle between the optical axis direction F3 of the first polarization adjustment component 31 and the second direction D2 is also set to be 90°, the incident light may not be deflected after passing through the liquid crystal grating 100, such that the effect of adjusting the incident light into different light entering human's left and right eyes may not be achieved.

Figure 5:
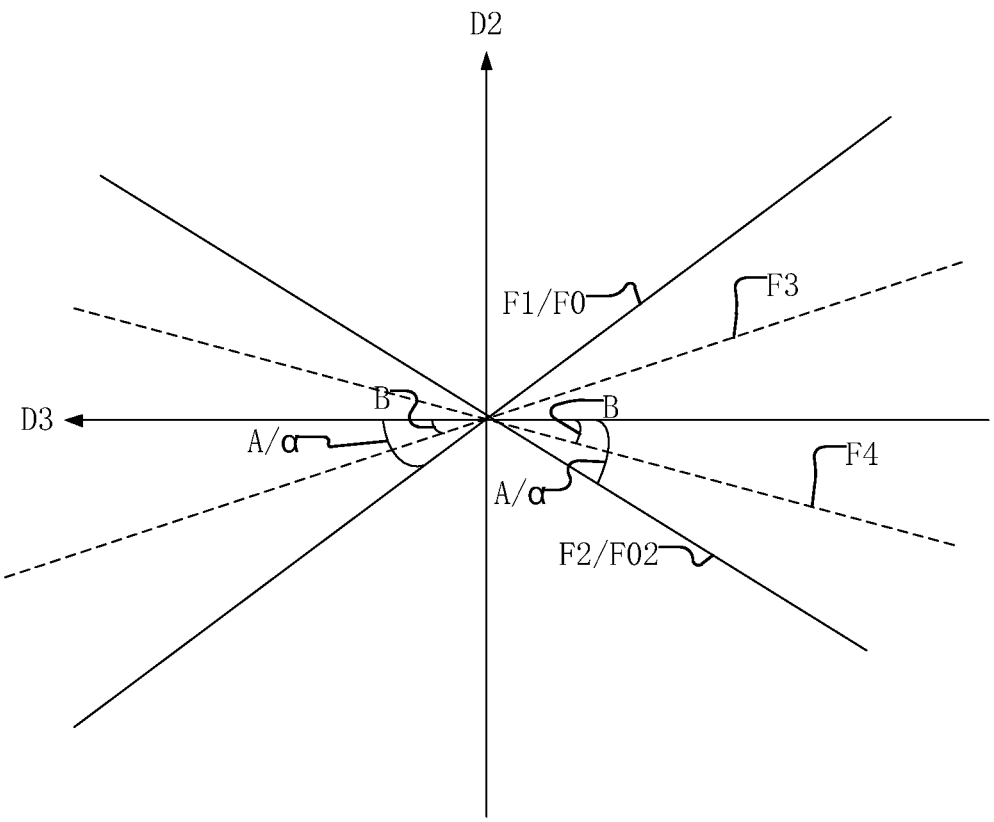
FIG. 5 illustrates a top view along a first direction in FIG. 2.

In an optional embodiment of the present disclosure, referring to FIG. 2 and FIG. 5, FIG. 5 illustrates a top view along the first direction in FIG. 2. It can be understood that the second direction D2 and the third direction D3 are used as the coordinate directions of the planar coordinate schematic shown in FIG. 5, which reflects the relative positional relationship between the alignment direction F1 of the first liquid crystal panel 21, a polarization direction F0 of the incident light, the optical axis direction F3 of the first polarization adjustment component 31, the alignment direction F2 of the second liquid crystal panel 22, and the optical axis direction F4 of the second polarization adjustment component 32, and a polarization direction F02 of the exiting light. The angle between the alignment direction F1 of the first liquid crystal panel 21 and the third direction D3 is A, and the angle between the optical axis direction F3 of the first polarization adjustment component 31 and the third direction D3 is B, where B=A/2. The third direction D3 is perpendicular to the first direction D1 and the second direction D2; the second direction D2 and the third direction D3 divide a plane perpendicular to the first direction D1 into four quadrants; and the angle A and the angle B are located in a same quadrant.

For example, referring to FIG. 2 and FIG. 5, in the liquid crystal grating 100 provided in the present disclosure, the angle A between the alignment direction F1 of the first liquid crystal panel 21 and the third direction D3 and the angle B between the optical axis direction F3 of the first polarization adjustment component 31 and the third direction D3 may satisfy the relationship of B=A/2. It should be noted that the angle A between the alignment direction F1 of the first liquid crystal panel 21 and the third direction D3 represents an acute angle between the alignment direction F1 of the first liquid crystal panel 21 and the third direction D3; and the angle B between the optical axis direction F3 of the first polarization adjustment component 31 and the third direction D3 represents an acute angle between the optical axis direction F3 of the first polarization adjustment component 31 and the third direction D3.

Only the light whose polarization direction is in parallel with the alignment direction of the liquid crystal panel can pass through the liquid crystal panel. In other words, the polarization direction F0 of the light incident on the liquid crystal grating 100 of the present disclosure may be in parallel with the alignment direction F1 of the first liquid crystal panel 21. That is, the acute angle between the polarization direction F0 of the incident light and the third direction D3 in FIG. 2 and FIG. 5 may also be A, that is, $\alpha$=A. When the angle between the optical axis direction F3 of the first polarization adjustment component 31 and the third direction D3 is B, the angle between the optical axis direction F4 of the second polarization adjustment component 32 and the third direction D3 may also be B. After the incident light exits from the first liquid crystal panel 21 and passes through the first polarization adjustment component 31, the polarization direction of the light may be deflected by an angle of 2B; after passing through the second polarization adjustment component 32, the polarization direction of the light may be further deflected by an angle of 2B. Therefore, the polarization direction of the light exiting from the second polarization adjustment component 32 may be deflected by an angle of 4B on the basis of the original A. In the liquid crystal grating 100 of the present disclosure, the angle between the alignment direction F1 of the first liquid crystal panel 21 and the alignment direction F2 of the second liquid crystal panel 22 is 4B, and F2 is deflected by angle 4B on the basis of F1. Therefore, when B is set to be A/2, it can be ensured that the polarization direction of the light after passing through the first polarization adjustment component 31 and the second polarization adjustment component 32 may be in parallel with the alignment direction of the second liquid crystal panel 22, thereby ensuring that the light can successfully exit from the second liquid crystal panel 22.

In an optional embodiment of the present disclosure, referring to FIG. 2 and FIG. 5, the angle A between the alignment direction F1 of the first liquid crystal panel 21 and the third direction D3 may be 45°. Correspondingly, the angle B between the optical axis direction F3 of the first polarization adjustment component 31 and the third direction D3 may be 22.5°.

For example, when the angle A between the alignment direction F1 of the first liquid crystal panel 21 and the third direction D3 is 45°, the polarization direction F0 of the incident light entering the first liquid crystal panel 21 may be same as the alignment direction F1 of the first liquid crystal panel 21, that is, the angle $\alpha$ between the polarization direction F0 of the incident light and the third direction D3 may also be 45°. After the incident light passes through the first liquid crystal panel 21 and the first polarization adjustment component 31 and exits the first polarization adjustment component 31, the polarization direction of the light may be changed by deflecting 45° on the basis of the incident light, and a polarization direction F01 may become a direction in parallel with the third direction D3 as shown in FIG. 2. After the light with such polarization direction passes through the second polarization adjustment component 32, the polarization direction may be deflected by 45° again and become the direction F02 which is in parallel with the alignment direction F2 of the second liquid crystal panel 22. Therefore, the light passing through the second polarization adjustment component 32 may successfully exit the second liquid crystal panel 22. It should be noted that, when the angle between the alignment direction F1 of the first liquid crystal panel 21 and the third direction D3 is 45°, and the angle between the optical axis direction F3 of the first polarization adjustment component 31 and the third direction D3 is 22.5°, the polarization direction may be deflected by 90° and the light may exit from the second liquid crystal panel 22 after the incident light passes through the first polarization adjustment component 31 and the second polarization adjustment component 32. At this point, the alignment direction F2 of the second liquid crystal panel 22 and the alignment direction F1 of the first liquid crystal panel 21 may be in a perpendicular relationship. Therefore, it is possible to use the same light adjustment components to form the solution with the first light adjustment component 20 and the second light adjustment component 30 in the liquid crystal grating 100 of the present disclosure, which is beneficial for simplifying the fabrication process of the liquid crystal grating 100 and simplifying the fabrication difficulty of the liquid crystal grating 100 in the present disclosure.

Figure 6:
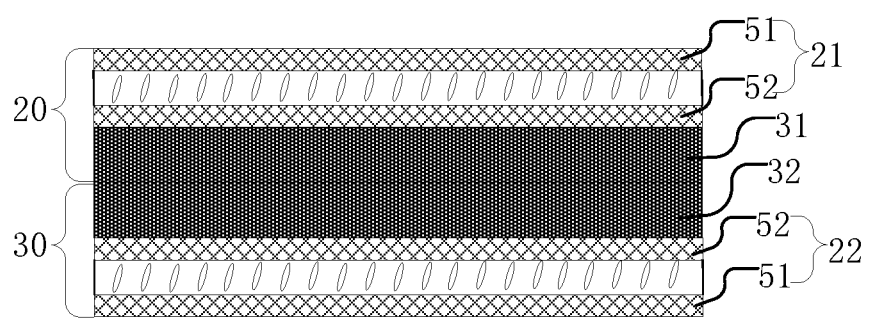
FIG. 6 illustrates another cross-sectional schematic of a liquid crystal grating according to various embodiments of the present disclosure.

In an optional embodiment of the present disclosure, FIG. 6 illustrates another cross-sectional schematic of the liquid crystal grating 100 according to various embodiments of the present disclosure. The first liquid crystal panel 21 and the second liquid crystal panel 22 may each have a first alignment layer 51 and a second alignment layer 52 which are arranged oppositely along the first direction D1, and a liquid crystal layer sandwiched between the first alignment layer 51 and the second alignment layer 52. In a same liquid crystal panel, the alignment directions of the first alignment layer 51 and the second alignment layer 52 may be in antiparallel with each other.

For example, each of the first liquid crystal panel 21 and the second liquid crystal panel 22 in the present disclosure may include two alignment layers, and the alignment directions of the first alignment layer 51 and the second alignment layer 52 in a same liquid crystal panel may be in antiparallel with each other. The alignment direction of the first liquid crystal panel mentioned in the present disclosure can be understood as the alignment direction of one alignment layer of the first liquid crystal panel 21; and the alignment direction of the second liquid crystal panel 22 can be understood as the alignment direction of one alignment layer in the second liquid crystal panel 22. The first liquid crystal panel 21 and the second liquid crystal panel 22 may be respectively used to adjust the exiting angle of the incident light, such that the exiting light may respectively enter into human's two eyes to implement the large-angle holographic display.

In an optional embodiment of the present disclosure, referring to FIG. 2, the structure of the second light adjustment component 30 may be a duplicate of the structure of the first light adjustment component 20. That is, in the liquid crystal grating 100 of the embodiments of the present disclosure, the structure obtained by rotating the first light adjustment component 20 along the rotation axis by 180° may be exactly same as the structure of the second light adjustment component 30 (e.g., referring FIG. 4). The first light adjustment component 20 and the second light adjustment component 30 may have an exactly same structure, but only have different disposing positions. It should be noted that "same structure" can be understood as the internal structures of the liquid crystal panels in two light adjustment components may be same, the arrangements between the liquid crystal panels and the polarization adjustment components may be same, and the like. In such way, two same light adjustment components may be used as the first light adjustment component 20 and the second light adjustment component 30 in the present disclosure; and the first light adjustment component 20 and the second light adjustment component 30 may be fabricated in a same process. That is, the liquid crystal grating 100 of the embodiments of the present disclosure may be formed by combining two light adjustment components fabricated by the same process. Therefore, the process of the liquid crystal grating 100 in the present disclosure may be greatly simplified, and the fabrication difficulty of the liquid crystal grating 100 may be reduced, which is beneficial for improving the production efficiency of the liquid crystal grating 100.

Figure 7:
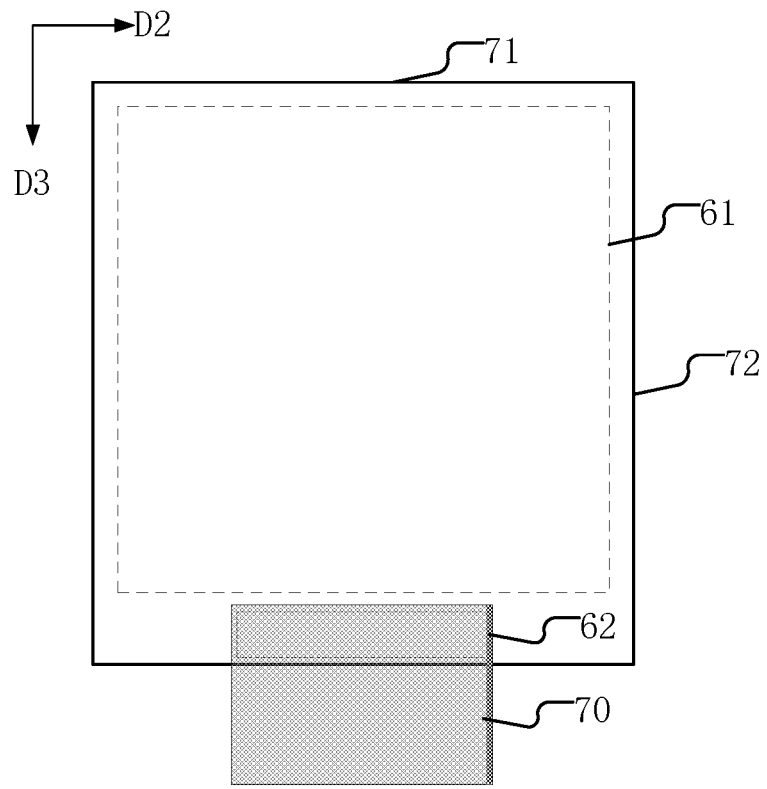
FIG. 7 illustrates a top view of a first liquid crystal panel/a second liquid crystal panel according to various embodiments of the present disclosure.

In an optional embodiment of the present disclosure, FIG. 7 illustrates a top view of the first liquid crystal panel 21 and the second liquid crystal panel 22 according to various embodiments of the present disclosure. Referring to FIG. 3 and FIG. 7, each of the first liquid crystal panel 21 and the second liquid crystal panel 22 may include a light adjustment region 61 and a binding region 62. In any one of the first liquid crystal panel 21 and the second liquid crystal panel 22, the light adjustment region 61 and the binding region 62 may be arranged along the third direction D3. Referring FIG. 2 and FIG. 7, the third direction D3 may be perpendicular to the first direction D1 and the second direction D2.

For example, referring to FIG. 2 and FIG. 7, each of the first liquid crystal panel 21 and the second liquid crystal panel 22 may include the light adjustment region 61 and the binding region 62. Optionally, the binding region 62 may be used to bind a flexible circuit board 70, and the light adjustment region 61 corresponding to the flexible circuit board 70 may be used to transmit related control instructions. For example, the intensity of light emitted from the first liquid crystal panel 21 and the second liquid crystal panel 22 may be controlled. In the present disclosure, the light adjustment region 61 and the binding region 62 in the first liquid crystal panel 21 and the second liquid crystal panel 22 may be arranged along the third direction D3; and the third direction D3 may be perpendicular to the first direction D1 and the second direction D2, respectively. In the present disclosure, the binding region 62 may be disposed on one side of the light adjustment region 61 along the first direction D1. When actually forming the liquid crystal grating 100, the flexible circuit board 70 may be folded back to the back of the first liquid crystal panel 21 or the second liquid crystal panel 22 to reduce the space of a non-light adjustment region (e.g., a region other than the light-adjustment region 61) in the first liquid crystal panel 21 and the second liquid crystal panel 22, which is beneficial for implementing the narrow frame design of the first liquid crystal panel 21 and the second liquid crystal panel 22.

In an optional embodiment of the present disclosure, referring to FIG. 2 and FIG. 7, the edge of the first liquid crystal panel 21 may include a first side 71 and a second side 72 which are connected with each other. The angle between the first side 71 and the second side 72 may be 90 degrees; and the second direction D2 may be in parallel with the first side 71.

For example, referring to FIG. 2 and FIG. 7, the rectangular structures of the first liquid crystal panel 21 and the second liquid crystal panel 22 may be taken examples to illustrate the present disclosure. The first side 71 and the second side 72 of the first liquid crystal panel 21 may be perpendicular to each other. In the present disclosure, the above-mentioned second direction D2 may be in parallel with the first side 71, and the above-mentioned third direction D3 may be in parallel with the second side 72. The first light adjustment component 20 may be rotated by 180° along the rotation axis, which can be understood that the first light adjustment component 20 may be rotated using the first side 71 of the first liquid crystal panel 21 as the rotation axis. In the present application, the first liquid crystal panel 21 and the second liquid crystal panel 22 may be set as rectangular structures. In the process of fabricating the liquid crystal grating 100, the first sides 71 and the second sides 72 of the first liquid crystal panel 21 and the second liquid crystal panel 22 with the rectangular structures may be used as a combination reference of the light adjustment components. Therefore, the combination of the first light adjustment component 20 and the second light adjustment component 30 may be more convenient.

Obviously, in some other embodiments of the present disclosure, the first liquid crystal panel 21 and the second liquid crystal panel 22 may also be arranged as other shapes, for example, a circle, an ellipse, or an irregular shape, according to actual needs, which may not be limited according to various embodiments of the present disclosure.

Figure 8:
FIG. 8 illustrates a structural schematic of a half-wave plate according to various embodiments of the present disclosure.

In an optional embodiment of the present disclosure, referring to FIG. 2 and FIG. 8. FIG. 8 illustrates a structural schematic of a half-wave plate 40 according to various embodiments of the present disclosure. Each of the first polarization adjustment component 31 and the second polarization adjustment component 32 may be the half-wave plate 40. When linearly polarized light enters the half-wave plate 40, the half-wave plate 40 may adjust the polarization direction of the linearly polarized light. When the angle between the optical axis direction of the half-wave plate and the third direction D3 is B, the polarization direction of the linearly polarized light exited from the half-wave plate may be deflected at an angle of 2B. Therefore, the half-wave plate 40 may be used to adjust the polarization direction of the linearly polarized light. When the first polarization adjustment component 31 and the second polarization adjustment component 32 in the present disclosure are both embodied as half-wave plates 40, the polarization direction may be deflected at an angle of 4B after the incident light sequentially passes through the two half-wave plates 40, such that the polarization direction of the light exited from the second linear polarization adjustment component is in parallel with the alignment direction F2 of the second liquid crystal panel 22, thereby ensuring that the light may be successfully exited from the second liquid crystal panel 22.

Figure 9:
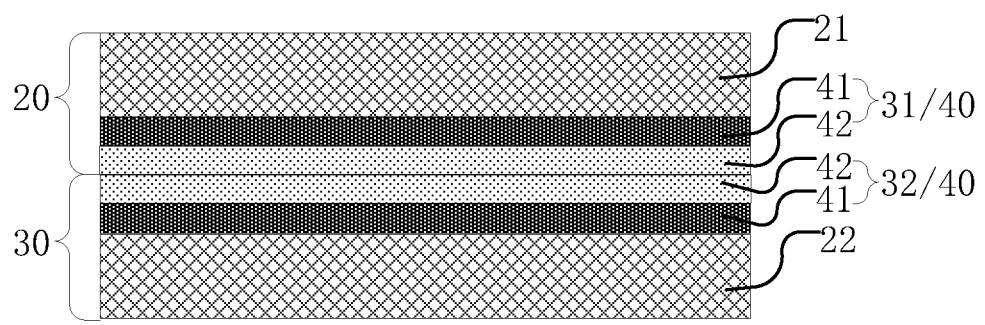
FIG. 9 illustrates another cross-sectional schematic of a liquid crystal grating according to various embodiments of the present disclosure.

In an optional embodiment of the present disclosure, FIG. 9 illustrates another cross-sectional schematic of the liquid crystal grating 100 according to various embodiments of the present disclosure. Referring to FIG. 8 and FIG. 9, the half-wave plate 40 may at least include a substrate layer 41 and a polarizing film 42. The substrate layer 41 in the first polarization adjustment component 31 may be located between the first liquid crystal panel 21 and the polarizing film 42; and the substrate layer 41 in the second polarization adjustment component 32 may be located between the second liquid crystal panel 22 and the polarizing film 42.

For example, when the first polarization adjustment component 31 and the second polarization adjustment component 32 are formed by half-wave plates 40, the half-wave plates 40 may use structures by combining the substrate layer 41 and the polarizing film 42. Optionally, the first polarization adjustment component 31 and the first liquid crystal panel 21 may be attached and fixed by an optical adhesive layer. During the attaching process, the substrate layer 41 in the half-wave plate 40 corresponding to the first polarization adjustment component 31 may be attached and fixed to the first liquid crystal panel 21. Optionally, the second polarization adjustment component 32 and the second liquid crystal panel 22 may be attached and fixed by an optical adhesive layer. During the attaching process, the substrate layer 41 in the half-wave plate 40 corresponding to the second polarization adjustment component 32 may be attached and fixed to the second liquid crystal panel 22. In the present disclosure, the attaching process of the first polarization adjustment component 31 and the first liquid crystal panel 21 and the attaching process of the second polarization adjustment component 32 and the second liquid crystal panel 22 may be fabricated in a same process. That is, the first light adjustment component 20 and the second light adjustment component 30 may be formed by a same process, which is beneficial for simplifying the process of the liquid crystal grating 100 and improving the production efficiency of the liquid crystal grating 100 in the present disclosure.

In some other embodiments of the present disclosure, when the first polarization adjustment component 31 is attached to the first liquid crystal panel 21, the polarizing film 42 of the half-wave plate 40 in the first polarization adjustment component 31 and the first liquid crystal panel 21 may be attached. Correspondingly, when the second polarization adjustment component 32 is attached to the second liquid crystal panel 22, the polarizing film 42 of the half-wave plate 40 in the second polarization adjustment component 32 may be attached to the second liquid crystal panel 22. In other words, in the first light adjustment component 20 and the second light adjustment component 30, when the liquid crystal panel of one of the above-mentioned components is attached to the substrate layer 41 of the half-wave plate 40, the liquid crystal panel of the other one of the above-mentioned components is also attached to the substrate layer 41 of the half-wave plate 40; when the liquid crystal panel of one of the above-mentioned components is attached to the polarizing film 42 of the half-wave plate 40, the liquid crystal panel of the other one of the above-mentioned components may also be attached to the polarizing film 42 of the half-wave plate 40, which is beneficial for ensuring the structural consistency of the first light adjustment component 20 and the second light adjustment component 30.

Optionally, the substrate layer 41 in the half-wave plate 40 may be a triacetate cellulose film (TAC) or other transparent film layer; and the polarizing film 42 may be a polyvinyl alcohol (PVA) film with polarization characteristics. For example, the polyvinyl alcohol film may be fabricated with high permeability and high polarization characteristics through a wet stretching process, thereby implementing the polarization characteristics of the half-wave plate 40.

Figure 10:
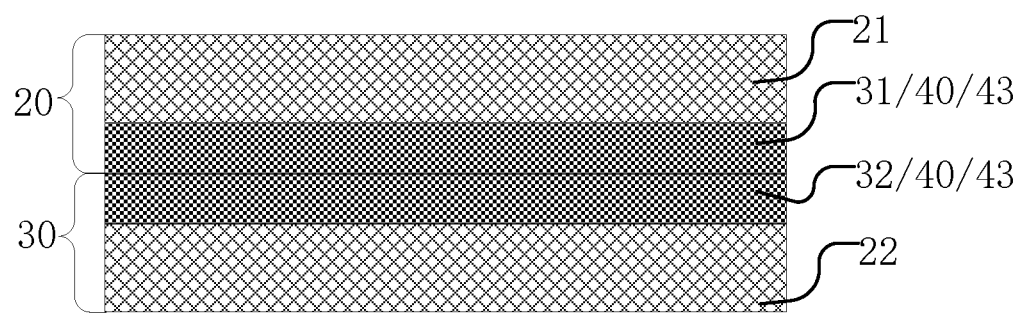
FIG. 10 illustrates another cross-sectional schematic of a liquid crystal grating according to various embodiments of the present disclosure.

In an optional embodiment of the present disclosure, FIG. 10 illustrates another cross-sectional schematic of the liquid crystal grating 100 according to various embodiments of the present disclosure. The half-wave plate 40 may be a liquid crystal wave plate 43.

For example, when the half-wave plates 40 are used as the first polarization adjustment component 31 and the second polarization adjustment component 32 in the present disclosure, the half-wave plates 40 may also be fabricated by the liquid crystal film structures, as shown in FIG. 10. In such way, the first liquid crystal panel 21 or the second liquid crystal panel 22 may be directly multiplexed as the substrate of the liquid crystal wave plate 43; and the liquid crystal wave plates may be directly coated on the surfaces of the first liquid crystal panel 21 and the second liquid crystal panel 22 without providing an additional substrate, which is beneficial for reducing the thickness of the liquid crystal grating 100 in the present disclosure.

In some other embodiments of the present disclosure, in addition to directly coating the liquid crystal wave plates 43 on the surfaces of the first liquid crystal panel 21 and the second liquid crystal panel 22, other manners may also be used for combining the first liquid crystal panel 21 and the second liquid crystal panel 22. For example, the liquid crystal wave plate 43 may also be attached and fixed to the first liquid crystal panel 21 or the second liquid crystal panel 22 through an optical adhesive layer. The fixing manner of the liquid crystal wave plate 43 and each of the first liquid crystal panel 21 and the second liquid crystal panel 22 may not be limited in the present disclosure, as long as it may ensure that the fixing manner of the first liquid crystal panel 21 and the liquid crystal wave plate 43 and the fixing manner of the second liquid crystal panel 22 and the liquid crystal wave plate 43 are same.

In an optional embodiment of the present disclosure, the adjustment wave bands of the first polarization adjustment component 31 and the second polarization adjustment component 32 may at least cover the wave bands of red, green and blue tricolor light.

For example, in the present disclosure, the first polarization adjustment component 31 and the second polarization adjustment component 32 have wide-band characteristics, that is, cover at least the wave bands of red, green, and blue tricolor light, thereby facilitating the adjustment of the polarization direction of the tricolor backlight to realize the holographic 3D display. It should be noted that when the structures of the half-wave plates 40 are used in the first polarization adjustment component 31 and the second polarization adjustment component 32, the half-wave plate 40 composed of the substrate and the polarizing film 42 and the half-wave plate 40 composed of the liquid crystal wave plate 43 may both have wide-band characteristics, and cover the wave bands of red, green and blue tricolor light.

Figure 11:
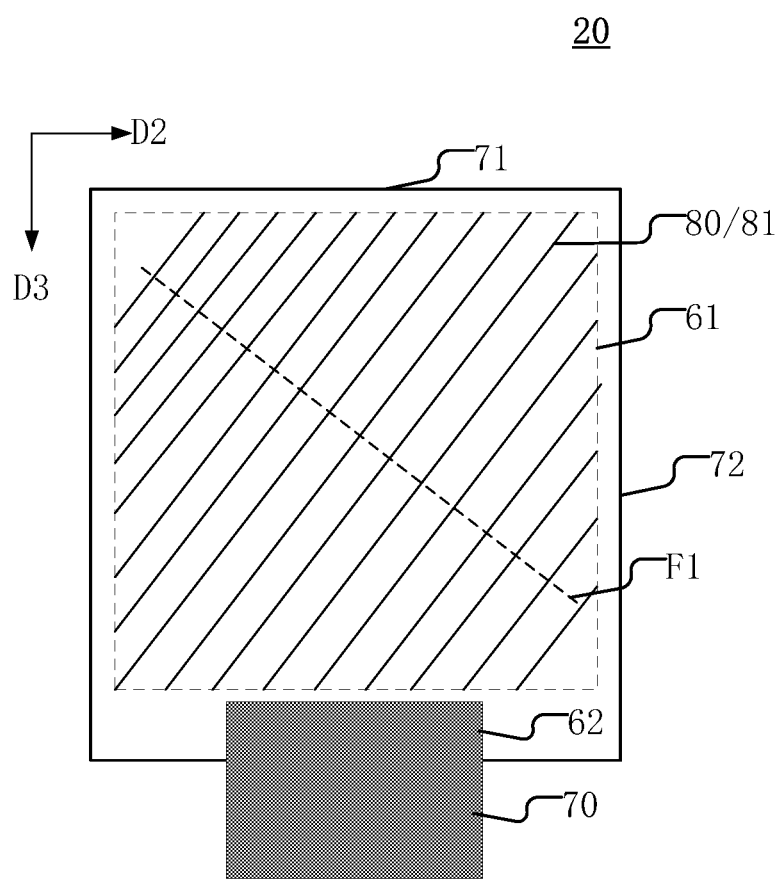
FIG. 11 illustrates a schematic of grating electrodes in a first liquid crystal panel according to various embodiments of the present disclosure.

In an optional embodiment of the present disclosure, FIG. 11 illustrates a schematic of grating electrodes 80/81 in the first liquid crystal panel 21 according to various embodiments of the present disclosure; and FIG. 12 illustrates a schematic of grating electrodes 80/82 in the second liquid crystal panel 22 according to various embodiments of the present disclosure. The first liquid crystal panel 21 and the second liquid crystal panel 22 may each include a plurality of grating electrodes 80; the extending direction of the grating electrodes 81 in the first liquid crystal panel 21 may be perpendicular to the alignment direction F1 of the first liquid crystal panel 21; and the extending direction of the grating electrodes 82 in the second liquid crystal panel 22 may be perpendicular to the alignment direction F2 of the second liquid crystal panel 22.

For example, referring to FIGS. 11-12, the extending direction of the grating electrodes 81 in the first liquid crystal panel 21 may be perpendicular to the alignment direction F1 of the first liquid crystal panel 21; and the extending direction of the grating electrodes 82 in the second liquid crystal panel 22 may be perpendicular to the alignment direction F2 of the second liquid crystal panel 22. Therefore, in the liquid crystal grating 100, the extending direction of the grating electrodes 81 in the first liquid crystal panel 21 may be different from the extending direction of the grating electrodes 82 in the second liquid crystal panel 22. The extending direction of the grating electrodes 80 may be related to the propagation deviation direction of the exited light. After the incident light passes through the first liquid crystal panel 21 and the second liquid crystal panel 22, two light rays shifted along different propagation directions may be formed, and the two light rays may enter the human's left and right eyes, respectively, thereby implementing the large-angle holographic display. Optionally, the grating electrode 80 may be electrically connected to a drive circuit (not shown), and each drive circuit may be electrically connected to the flexible circuit board 70. In practical applications, the drive circuit may be used to transmit electrical signals to the grating electrodes 80 to adjust the intensity of the light exited from the first liquid crystal panel 21 and the second liquid crystal panel 22.

In an optional embodiment of the present disclosure, referring to FIGS. 11-12, the extending direction of the grating electrodes 81 in the first liquid crystal panel 21 and the extending direction of the grating electrodes 82 in the second liquid crystal panel 22 may be perpendicular to each other.

For example, when the extending direction of the grating electrodes 81 in the first liquid crystal panel 21 is perpendicular to the extending direction of the grating electrodes 82 in the second liquid crystal panel 22, the extending direction of the grating electrodes 81 in the first liquid crystal panel 21 is perpendicular to the alignment direction F1 of the first liquid crystal panel 21, and the extending direction of the grating electrodes 82 in the second liquid crystal panel 22 is perpendicular to the alignment direction F2 of the second liquid crystal panel 22, such that the alignment direction F1 of the first liquid crystal panel 21 may be perpendicular to the alignment direction F2 of the second liquid crystal panel 22. Meanwhile, since the alignment direction of the first liquid crystal panel 21 is in parallel with the alignment direction of the second liquid crystal panel 22 when the first light adjustment component 20 is rotated 180° around the rotation axis, it may further demonstrate that the structure of the liquid crystal panel in the first light adjustment component 20 is exactly same as the structure of the liquid crystal panel in the second light adjustment component 30, and same light adjustment components may be used to form the first light adjustment component 20 and the second light adjustment component 30 in the liquid crystal grating 100. Therefore, it is beneficial for simplifying the process of the liquid crystal grating 100 and reducing the fabrication difficulty of the liquid crystal grating 100.

Figure 14:
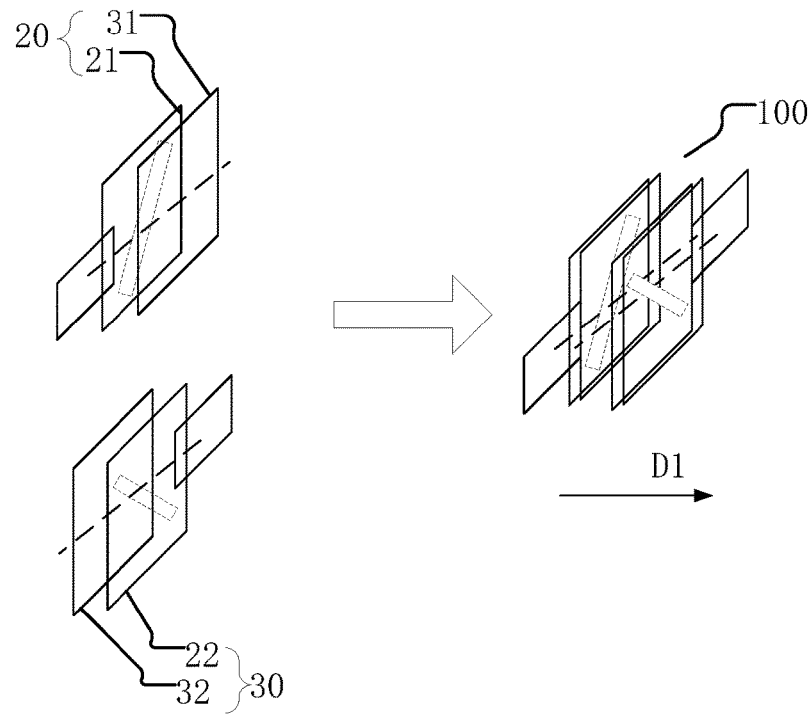
FIG. 14 illustrates a process schematic for fabricating a liquid crystal grating according to various embodiments of the present disclosure.

Based on the same inventive concept, the present disclosure also provides a method for fabricating the liquid crystal grating 100, which may be used for fabricating the liquid crystal grating 100 described in any one of the above-mentioned embodiments. FIG. 13 illustrates a flowchart of a method for fabricating the liquid crystal grating 100 according to various embodiments of the present disclosure; and FIG. 14 illustrates a process schematic for fabricating the liquid crystal grating 100 according to various embodiments of the present disclosure. Referring to FIG. 2, FIG. 13, and FIG. 14, the fabrication method may include:

S01, providing two same light adjustment components, where the light adjustment components may include the liquid crystal panels and the polarization adjustment components disposed on the first surfaces of the liquid crystal panels; the two light adjustment components may be the first light adjustment component 20 and the second light adjustment component 30; the first light adjustment component 20 may include the first liquid crystal panel 21 and the first polarization adjustment component 31, and the second light adjustment component 30 may include the second liquid crystal panel 22 and the second polarization adjustment component 32; and S02, disposing the first light adjustment component 20 and the second light adjustment component 30 oppositely along the first direction D1 and combining such light adjustment components into the liquid crystal grating 100, where in the liquid crystal grating 100, along the first direction D1, the first polarization adjustment component 31 and the second polarization adjustment component 32 may be configured between the first liquid crystal panel 21 and the second liquid crystal panel 22; and the first direction D1 may be the stacking direction of the first light adjustment component 20 and the second light adjustment component 30.

When the first light adjustment component 20 is rotated 180 degrees around the rotation axis, the disposing position of the first light adjustment component 20 may be same as the disposing position of the second light adjustment component 30 along the plane perpendicular to the first direction D1.

For example, referring to FIG. 2, FIG. 13, and FIG. 14, in the method for fabricating the liquid crystal grating 100 provided in the present disclosure, two same light adjustment components may be used to fabricate the liquid crystal grating 100, the light adjustment components may include the liquid crystal panels and the polarization adjustment components arranged on the first surfaces of the liquid crystal panels, and two same light adjustment components may be the first light adjustment component 20 and the second light adjustment component 30, respectively. The first light adjustment component 20 and the second light adjustment component 30 may be disposed oppositely along the first direction D1 and combined into the liquid crystal grating 100. In the formed liquid crystal grating 100, along the first direction D1, the first polarization adjustment component 31 and the second polarization adjustment component 32 may be configured between the first liquid crystal panel 21 and the second liquid crystal panel 22. When the first light adjustment component 20 is rotated 180 degrees around the rotation axis, the disposing position of the first light adjustment component 20 may be same as the disposing position of the second light adjustment component 30 along the plane perpendicular to the first direction D1.

In the fabrication method of the liquid crystal grating 100 provided in the present disclosure, two same light adjustment components may be oppositely disposed and combined to form the liquid crystal grating 100 according to preset positions, where the two light adjustment components, which are completely identical, may be fabricated using a same fabrication process. However, in the liquid crystal grating fabricated using the existing technology, for two liquid crystal panels, the first liquid crystal panel needs to be attached to the half-wave plate, and the second liquid crystal panel also needs to be attached to the half-wave plate attached to the first liquid crystal panel. The two attaching processes may be completed by different complicated fabrication processes. Therefore, compared with the existing technology where the liquid crystal grating needs two different attaching processes, in the method for fabricating the liquid crystal grating 100 provided by the present disclosure, two same light adjustment components may be fabricated using a same fabrication process. Therefore, it is beneficial for simplifying the fabrication process of the liquid crystal grating 100, reducing the design and fabrication difficulty of the liquid crystal grating 100, and improving the production efficiency of the liquid crystal grating 100. Furthermore, when each of the first light adjustment component 20 and the second adjustment component in the present disclosure is embodied as the same light adjustment component, it is also beneficial for improving the production yield of the liquid crystal grating 100.

Figure 15:
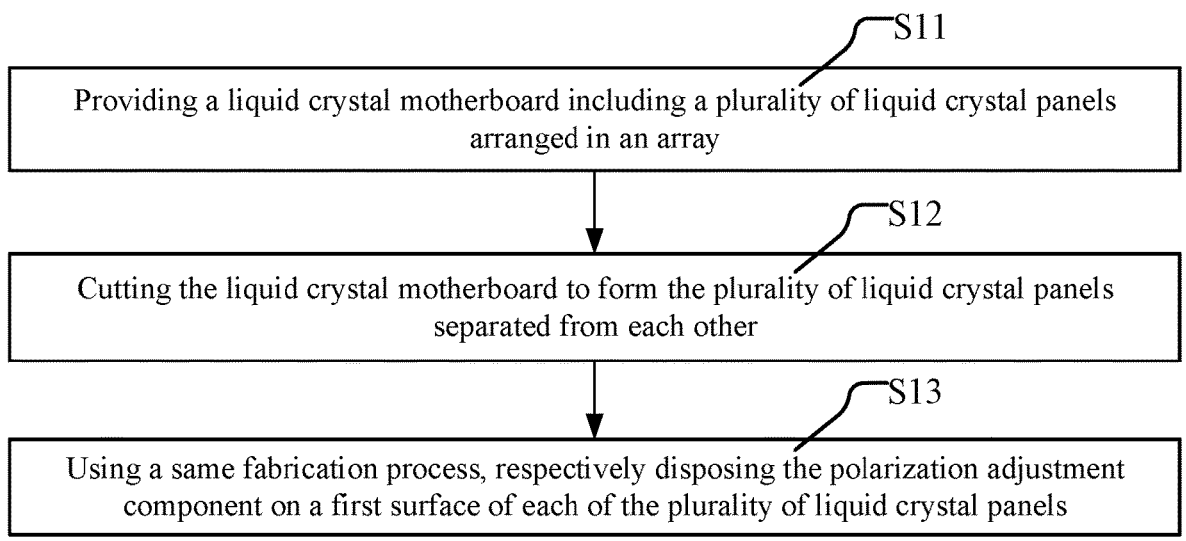
FIG. 15 illustrates a flowchart of a method for fabricating same light adjustment components according to various embodiments of the present disclosure.

In an optional embodiment of the present disclosure, referring to FIG. 15, FIG. 15 illustrates a flowchart of a method for fabricating same light adjustment components according to various embodiments of the present disclosure. The method of fabricating the same light adjustment components may include:

S11, providing a liquid crystal motherboard, where the liquid crystal motherboard includes a plurality of liquid crystal panels arranged in an array;

S12, cutting the liquid crystal motherboard to form a plurality of independent liquid crystal panels; and S13, using a same fabrication process, respectively disposing the polarization adjustment component on the first surface of each of the liquid crystal panels.

For example, FIG. 15 illustrates a flowchart of the method for fabricating the same light adjustment components. The liquid crystal motherboard may be first provided, where the liquid crystal motherboard includes the plurality of liquid crystal panels arranged in an array. It can be understood that the structures of the plurality of liquid crystal panels located in the same liquid crystal motherboard may be completely same. After the liquid crystal motherboard is cut through step S12, the structures of the formed plurality of independent liquid crystal panels may be completely same. Next, through step S13, using the same fabrication process, the polarization adjustment component may be respectively disposed on the first surface of each of the same liquid crystal panels, thereby forming the plurality of light adjustment components with the same structure. It can be seen that when the light adjustment components are fabricated, the liquid crystal panels may be from the same liquid crystal motherboard, and the structures of all liquid crystal panels may be exactly same. The polarization adjustment components are disposed on the surfaces of the liquid crystal panels through the same process, such that the light adjustment components composed of the polarization adjustment components and the liquid crystal panels may be completely same. It can be seen that two light adjustment components forming the liquid crystal grating in the present disclosure are exactly same structures, fabricated in the same fabrication process; and the two light adjustment components may be oppositely disposed according to certain rules and combined into the liquid crystal grating, which may greatly simplify the fabrication process and difficulty of the liquid crystal grating.

In an optional embodiment of the present disclosure, referring to FIG. 9, the polarization adjustment component may be the half-wave plate 40 including the substrate layer 41 and the polarizing film 42. In the above-mentioned step S13, the method of respectively disposing the polarization adjustment component on the first surface of each of the plurality of liquid crystal panels may be attaching the half-wave plate 40 to the first surface of each of the liquid crystal panels through an optical adhesive to position the substrate layer 41 between the polarizing film 42 and the first surface of the liquid crystal panel.

For example, after cutting the liquid crystal motherboard to form the plurality of liquid crystal panels, the first surface of each liquid crystal panel may be coated with a same thickness of an optical adhesive, and then the substrate layer 41 of the half-wave plate 40 may be attached with the optical adhesive, thereby implementing the attaching and fixing of the half-wave plate 40 with the liquid crystal panel. It should be noted that the half-wave plate 40 in one embodiment may be separately prepared in advance. The plurality of light adjustment components with the same structure may be formed by directly attaching and fixing the separately prepared half-wave plates 40 with the liquid crystal panels, respectively, through the above-mentioned method, which may have a simple fabrication process and a low cost.

In an optional embodiment of the present disclosure, referring to FIG. 10, the polarization adjustment component may be the half-wave plate 40 which is the liquid crystal wave plate 43. In the above-mentioned step S13, the method of respectively disposing the polarization adjustment component on the first surface of each of the plurality of liquid crystal panels may be coating the liquid crystal wave plate 43 on the first surface of each liquid crystal panel.

For example, after the liquid crystal motherboard is cut to form the plurality of liquid crystal panels, according to the above-mentioned method, the liquid crystal panels may be directly used as the substrates of the liquid crystal wave plates 43, without the need for separately fabricating the liquid crystal wave plates 43; and the liquid crystal wave plates 43 may be directly coated on the liquid crystal panels to form the plurality of same light adjustment components. Therefore, it is beneficial for reducing the thickness of the light adjustment component, and further reduce the overall thickness of the liquid crystal grating 100 formed by stacking two light adjustment components. Moreover, the process of directly coating the liquid crystal wave plate 43 on the liquid crystal panel may also be beneficial for simplifying the fabrication process of the light adjustment component and improving the production efficiency of the light adjustment component.

Figure 16:
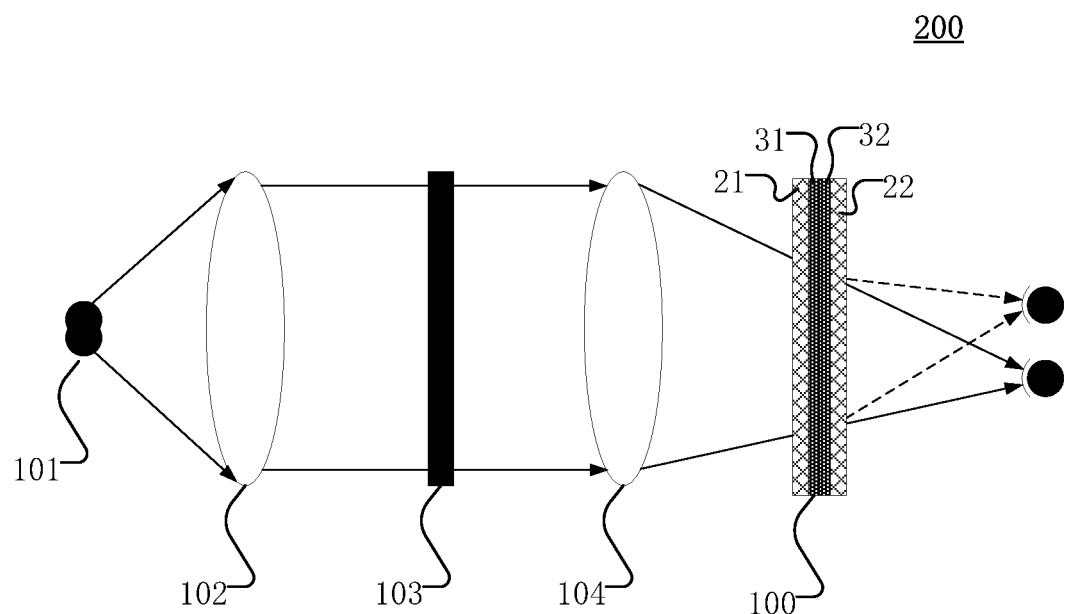
FIG. 16 illustrates a structural schematic of a display device according to various embodiments of the present disclosure.

Based on the same inventive concept, the present disclosure also provides a display device. FIG. 16 illustrates a structural schematic of a display device 200 according to various embodiments of the present disclosure. The display device 200 may be a holographic 3D display device, including:

a light source device 101, configured to emit coherent RGB tricolor light in time sequence;

a beam expanding/collimating component 102, configured to perform beam expanding and collimating processing on the light emitted from the light source device 101;

a spatial light modulator 103, configured to sequentially perform phase modulation and amplitude modulation on the light exited from the beam expanding/collimating component 102;

a field lens 104, configured to improve the ability of the edge light of the light exited from the spatial light modulator 103 to enter the liquid crystal grating 100; and a liquid crystal grating 100, configured to form a left-eye image and a right-eye image based on the incident light, where the liquid crystal grating 100 may be the liquid crystal grating 100 described in any of the above-mentioned embodiments of the present application.

The liquid crystal grating 100 provided in the above-mentioned embodiment may be used in the display device provided in one embodiment of the present disclosure. The liquid crystal grating 100 may form a left-eye image and a right-eye image based on the incident light, thereby implementing the large-angle holographic display. The fabrication process of the liquid crystal grating 100 in the above-mentioned embodiment is simple, such that the fabrication process of the display device provided by the present disclosure may also be simple.

Optionally, referring to FIG. 16 and FIG. 2, the light incident to the liquid crystal grating 100 may sequentially pass through the first liquid crystal panel 21, the first polarization adjustment component 31, the second polarization adjustment component 32, and the second liquid crystal panel 22 and exit from the second liquid crystal panel 22; the light incident to the liquid crystal grating 100 may be linearly polarized light, and the polarization direction of the linearly polarized light may be in parallel with the alignment direction F1 of the first liquid crystal panel 21.

For example, in the display device of the embodiments of the present disclosure, the light exited from the field lens 104 may be used as the incident light of the liquid crystal grating 100; and the light incident to the liquid crystal grating 100 may sequentially pass through the first liquid crystal panel 21, the first polarization adjustment component 31, the second polarization adjustment component 32 and the second liquid crystal panel 22, and exit from the second liquid crystal panel 22. The incident light of the liquid crystal grating 100 may be linearly polarized light, and the polarization direction of the linearly polarized light may be in parallel with the alignment direction of the first liquid crystal panel 21. In such way, the incident light may pass through the first liquid crystal panel 21 successfully, and under the joint action of the first liquid crystal panel 21, the first polarization adjustment component 31, the second polarization adjustment component 32, and the second liquid crystal panel 22, the deflection angle may be changed to form different light rays entering into two eyes, thereby implementing the large-angle holographic display.

For the display device provided by the present disclosure, since it corresponds to the liquid crystal grating disclosed in the above-mentioned embodiments, the description of the display device may be relatively simple, and related details may refer to the description of the corresponding part of the liquid crystal grating.

From the above-mentioned embodiments, it can be seen that the liquid crystal grating and its fabrication method, and the display device provided by the present disclosure may achieve at least the following beneficial effects.

In the liquid crystal grating and its fabrication method, and the display device provided by the present disclosure, when the first light adjustment component is rotated 180° around the rotation axis, the alignment direction of the first liquid crystal panel in the first light adjustment component may be in parallel with the alignment direction of the second liquid crystal panel in the second light adjustment component; and the direction of the optical axis of the first polarization adjustment component may be in parallel with the direction of the optical axis of the second polarization adjustment component. That is, the two same light adjustment components may be used to form the liquid crystal grating in the present disclosure, and the two same light adjustment components may be fabricated by the same fabrication process. Compared with the liquid crystal grating in the existing technology where the two liquid crystal panels and the half-wave plates are attached using different processes, the above-mentioned fabrication method may simplify the fabrication process of the liquid crystal grating in the present disclosure, which is beneficial for improving the production efficiency of the liquid crystal grating and the display device containing the liquid crystal grating.

Although certain embodiments of the present disclosure have been described in detail through examples, those skilled in the art should understand that the above-mentioned examples are merely for illustration and not for limiting the scope of the present disclosure. Those skilled in the art should understand that the above-mentioned embodiments may be modified without departing from the scope and spirit of the present disclosure, and the scope of the present disclosure is defined by the appended claims.

What is claimed is:

1. A liquid crystal grating, comprising:
a first light adjustment component and a second light adjustment component, disposed oppositely, wherein:
the first light adjustment component includes a first liquid crystal panel and a first polarization adjustment component disposed on a first surface of the first liquid crystal panel;
the second light adjustment component includes a second liquid crystal panel and a second polarization adjustment component disposed on a first surface of the second liquid crystal panel;
along a first direction, the first polarization adjustment component and the second polarization adjustment component are configured between the first liquid crystal panel and the second liquid crystal panel, wherein the first direction is a stacking direction of the first light adjustment component and the second light adjustment component;
using a second direction as an extending direction of a rotation axis, when the first light adjustment component is rotated 180° around the rotation axis, an alignment direction of the first liquid crystal panel of the first light adjustment component is in parallel with an alignment direction of the second liquid crystal panel, and an optical axis direction of the first polarization adjustment component is in parallel with an optical axis direction of the second polarization adjustment component; and
an angle between the alignment direction of the first liquid crystal panel and the second direction is not equal to 90°; and an angle between the optical axis direction of the first polarization adjustment component and the second direction is not equal to 90°, wherein the second direction is perpendicular to the first direction.

2. The liquid crystal grating according to claim 1, wherein:
an angle between the alignment direction of the first liquid crystal panel and a third direction is A, and an angle between the optical axis direction of the first polarization adjustment component and the third direction is B, wherein B=A/2, and the third direction is perpendicular to the first direction and the second direction; and
the second direction and the third direction divide a plane perpendicular to the first direction into four quadrants; and the angle A and the angle B are in a same quadrant.

3. The liquid crystal grating according to claim 2, wherein:
the angle between the alignment direction of the first liquid crystal panel and the third direction is about 45°.

4. The liquid crystal grating according to claim 1, wherein:
each of the first liquid crystal panel and the second liquid crystal panel has a first alignment layer and a second alignment layer which are disposed oppositely along the first direction, and a liquid crystal layer sandwiched between the first alignment layer and the second alignment layer; and in a same liquid crystal panel, the alignment directions of the first alignment layer and the second alignment layer are in antiparallel with each other.

5. The liquid crystal grating according to claim 1, wherein:
a structure of the first light adjustment component is a duplicate of a structure of the second light adjustment component.

6. The liquid crystal grating according to claim 5, wherein:
each of the first liquid crystal panel and the second liquid crystal panel includes a light adjustment region and a binding region; in any one of the first liquid crystal panel and the second liquid crystal panel, an arrangement direction of the light adjustment region and the binding region is in parallel with a third direction; and
the third direction is perpendicular to the first direction and the second direction.

7. The liquid crystal grating according to claim 1, wherein:
an edge of the first liquid crystal panel includes a first side and a second side connected with each other; an angle between the first side and the second side is about 90°; and the second direction is in parallel with the first side.

8. The liquid crystal grating according to claim 1, wherein:
each of the first polarization adjustment component and the second polarization adjustment component is a half-wave plate.

9. The liquid crystal grating according to claim 8, wherein:
the half-wave plate at least includes a substrate layer and a polarizing film; the substrate layer in the first polarization adjustment component is between the first liquid crystal panel and the polarizing film; and the substrate layer in the second polarization adjustment component is between the second liquid crystal panel and the polarizing film.

10. The liquid crystal grating according to claim 8, wherein:
the half-wave plate is a liquid crystal wave plate.

11. The liquid crystal grating according to claim 1, wherein:
adjustment wave bands of the first polarization adjustment component and the second polarization adjustment component at least cover wave bands of red, green and blue tricolor light.

12. The liquid crystal grating according to claim 1, wherein:
each of the first liquid crystal panel and the second liquid crystal panel includes a plurality of grating electrodes; an extending direction of the plurality of grating electrodes in the first liquid crystal panel is perpendicular to the alignment direction of the first liquid crystal panel; and an extending direction of the plurality of grating electrodes in the second liquid crystal panel is perpendicular to the alignment direction of the second liquid crystal panel.

13. The liquid crystal grating according to claim 12, wherein:
the extending direction of the plurality of grating electrodes in the first liquid crystal panel and the extending direction of the plurality of grating electrodes in the second liquid crystal panel are perpendicular to each other.

14. A method for fabricating a liquid crystal grating, comprising:
providing two same light adjustment components, each including a liquid crystal panel and a polarization adjustment component disposed on a first surfaces of the liquid crystal panel, wherein the two same light adjustment components are a first light adjustment component and a second light adjustment component; the first light adjustment component includes a first liquid crystal panel and a first polarization adjustment component; and the second light adjustment component includes a second liquid crystal panel and a second polarization adjustment component; and oppositely disposing the first light adjustment component and the second light adjustment component along a first direction and combining the first light adjustment component and the second light adjustment component into the liquid crystal grating, wherein in the liquid crystal grating, along the first direction, the first polarization adjustment component and the second polarization adjustment component are configured between the first liquid crystal panel and the second liquid crystal panel; and the first direction is a stacking direction of the first light adjustment component and the second light adjustment component, wherein:

when the first light adjustment component is rotated 180 degrees around a rotation axis, a disposing position of the first light adjustment component is same as a disposing position of the second light adjustment component along a plane perpendicular to the first direction.

15. The method according to claim 14, wherein fabricating the same light adjustment components includes:

providing a liquid crystal motherboard including a plurality of liquid crystal panels arranged in an array;

cutting the liquid crystal motherboard to form the plurality of liquid crystal panels separated from each other; and using a same fabrication process, respectively disposing the polarization adjustment component on the first surface of each of the plurality of liquid crystal panels.

16. The method according to claim 15, wherein:

the polarization adjustment component is a half-wave plate including a substrate layer and a polarizing film; and respectively disposing the polarization adjustment component on the first surface of each of the plurality of liquid crystal panels includes:

attaching the half-wave plate to the first surface of each of the plurality of liquid crystal panels through an optical adhesive to position the substrate layer between the polarizing film and the first surface of the liquid crystal panel.

17. The method according to claim 15, wherein:

the polarization adjustment component is a half-wave plate including a liquid crystal wave plate; and respectively disposing the polarization adjustment component on the first surface of each of the plurality of liquid crystal panels includes:

coating the liquid crystal wave plate on the first surface of each of the plurality of liquid crystal panels.

18. A display device, comprising:

a light source device, configured to emit coherent RGB tricolor light in time sequence;

a beam expanding/collimating component, configured to perform beam expanding and collimating processing on the light emitted from the light source device;

a spatial light modulator, configured to sequentially perform phase modulation and amplitude modulation on the light exited from the beam expanding/collimating component;

a field lens, configured to improve an ability of edge light of the light exited from the spatial light modulator to enter a liquid crystal grating; and the liquid crystal grating, configured to form a left-eye image and a right-eye image based on incident light, wherein the liquid crystal grating includes:

a first light adjustment component and a second light adjustment component, disposed oppositely, wherein:

the first light adjustment component includes a first liquid crystal panel and a first polarization adjustment component disposed on a first surface of the first liquid crystal panel;

the second light adjustment component includes a second liquid crystal panel and a second polarization adjustment component disposed on a first surface of the second liquid crystal panel;

along a first direction, the first polarization adjustment component and the second polarization adjustment component are configured between the first liquid crystal panel and the second liquid crystal panel, wherein the first direction is a stacking direction of the first light adjustment component and the second light adjustment component;

using a second direction as an extending direction of a rotation axis, when the first light adjustment component is rotated 180° around the rotation axis, an alignment direction of the first liquid crystal panel of the first light adjustment component is in parallel with an alignment direction of the second liquid crystal panel, and an optical axis direction of the first polarization adjustment component is in parallel with an optical axis direction of the second polarization adjustment component; and an angle between the alignment direction of the first liquid crystal panel and the second direction is not equal to 90°; and an angle between the optical axis direction of the first polarization adjustment component and the second direction is not equal to 90° wherein the second direction is perpendicular to the first direction.

19. The display device according to claim 18, wherein:

the light incident to the liquid crystal grating sequentially passes through the first liquid crystal panel, the first polarization adjustment component, the second polarization adjustment component, and the second liquid crystal panel, and exits from the second liquid crystal panel; and the light incident to the liquid crystal grating is linearly polarized light; and a polarization direction of the linearly polarized light is in parallel with the alignment direction of the first liquid crystal panel.

* * * * *